Dec. 3, 1963

H. J. VOLK 3,112,515

POULTRY TRUSSING DEVICE

Filed March 2, 1962

INVENTOR.
BY *Henry J. Volk*

*Webster & Webster*
ATTYS.

United States Patent Office 3,112,515

Patented Dec. 3, 1963

3,112,515

POULTRY TRUSSING DEVICE

Henry J. Volk, P.O. Box 646, Turlock, Calif., assignor of two-thirds to Anthony J. Volk, Turlock, Calif.

Filed Mar. 2, 1962, Ser. No. 177,024
5 Claims. (Cl. 17—11)

This invention relates to the poultry industry, and particularly to the commercial processing of dressed poultry, such as turkeys, to prepare the same for the retail market.

In this processing, it is desirable that the eviscerated fowl shall be "trussed"—a term used in the trade to denote generally the retention of the legs of the fowl in closely folded relation to each other and to the body.

The present invention is particularly an improvement over the device for the purpose shown in my copending application for patent, Serial No. 12,069, filed March 1, 1960, now abandoned; the principal object of this invention being to provide a retainer or yoke which engages the folded legs in such a manner that they are not only prevented from separating from each other and from moving away from the body of the fowl, but eliminates the necessity of having to sew up the bird after stuffing the same, as is ordinarily the case. Also, the yoke, which is applied by the processor or packing house, does not need to be removed from the fowl in order for the housewife or cook to stuff the same, and the yoke may be left in place during the cooking and subsequent carving operations.

A further object of this invention is to provide a poultry trussing device which is designed for ease and economy of manufacture.

Still another object of the invention is to provide a practical, reliable, and durable poultry trussing device, and one which will be exceedingly effective for the purpose for which it is designed.

These objects are accomplished by means of such structure and relative arrangement of parts as will fully appear by a perusal of the following specification and claims.

Figures 1, 2, 3, 4, 5:
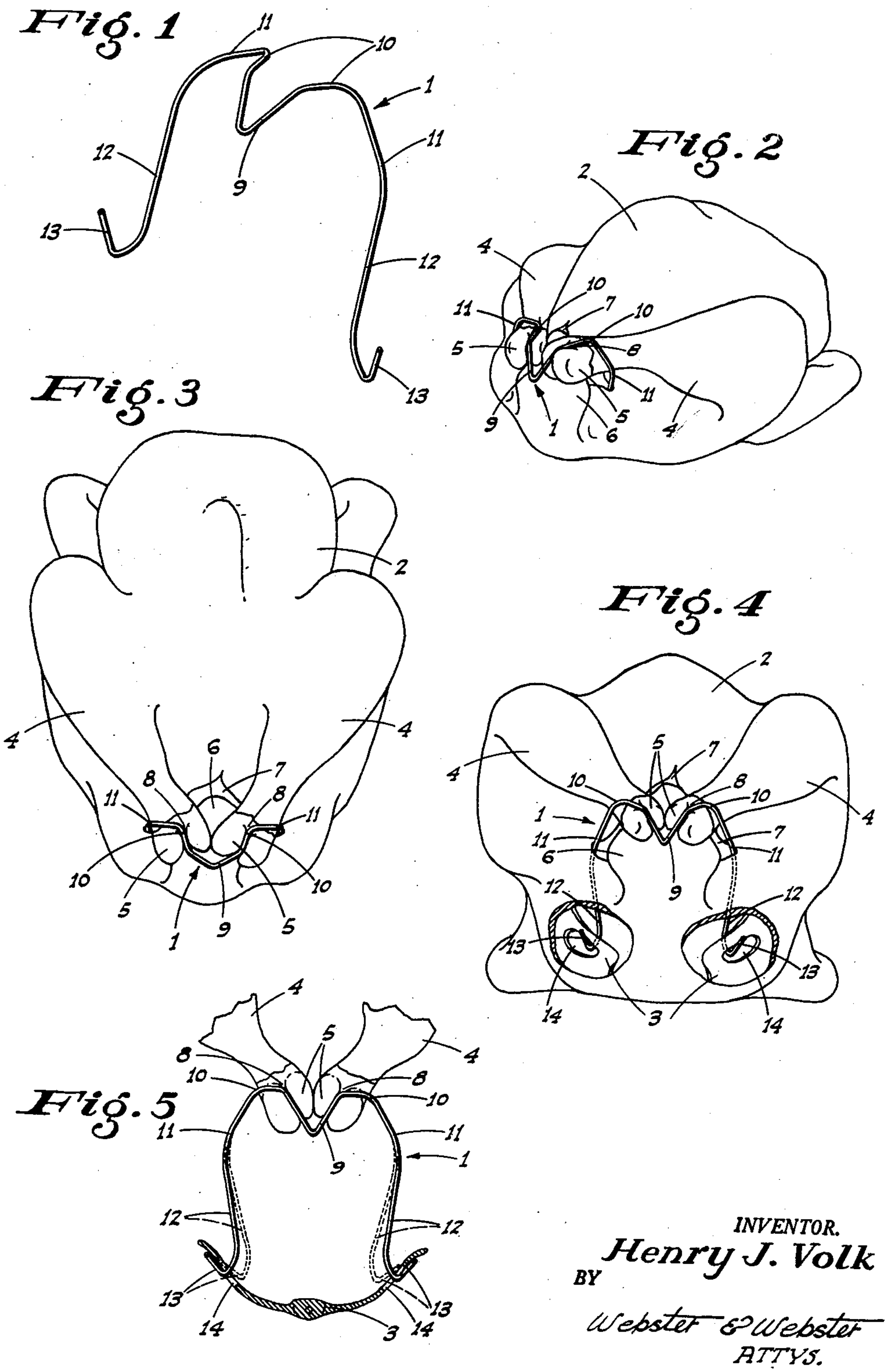
FIG. 1 is a perspective view of the improved retainer.
FIG. 2 is a perspective view of a dressed fowl as trussed by the retainer.
FIG. 3 is a similar but enlarged plan view of the trussed fowl.
FIG. 4 is a rear end view of the trussed fowl, partly in section to show the engagement of the hooks of the retainer in certain openings or sockets found in the backbone of a fowl.
FIG. 5 is an end view of the retainer, showing the engagement thereof with the hocks and backbone of a fowl in diagrammatic form.

Referring now more particularly to the drawings, and to the characters of reference marked thereon, the retainer, indicated generally at 1, is particularly designed for use on a dressed fowl, such as a turkey. Such a fowl includes an eviscerated body 2 which encloses the carcass which includes the backbone 3, legs 4 from which the shanks have been removed to expose the hocks 5, and a tail 6. The body 2, for the purpose of eviscertain and to enable the fowl to be then filled with stuffing as usual, is provided with an abdominal slit or opening 7 which extends from the breastbone of the fowl to the tail.

The exposed hocks are each formed with a crease or depression 8 intermediate the side edges of the hock and which depression extends lengthwise of the related leg. Also, such depressions are disposed so that when the legs are folded under the body, with the hocks in contact with each other, said depressions will be positioned in V-shaped relation to each other. This is of course the position of the legs when the fowl is trussed, at which time the tail 6 is folded under the contacting hocks, and partically closes the cavity slit or opening 7, as shown in FIGS. 2–4.

The retainer 1, which is designed to hold the legs in such folded position, is made of a single length of stiff but resilient wire, and is constructed as follows:

At its center of length, the wire is formed with a generally downwardly and rearwardly facing V 9, shaped to engage in the V-shaped configuration formed by the adjacent depressions 8 in the contacting hocks 5. From the outer ends of the V 9 the wire is bent outwardly and then downwardly to form curved saddles 10 of a size and disposed to engage over and depend from the outer sides of the legs 4 of the fowl immediately back from the hocks 5, or from where the hock depressions terminate. The saddles are thus disposed in transverse planes at acute angles relative to each other, both vertically and horizontally, and which planes in turn are disposed ahead of and at an acute angle to the transverse plane of the V 9.

From the front outer ends of the saddles, the retainer wire extends outwardly and downwardly for some distance, as shown at 11, to form the upper end portions of legs 12 which then extend downwardly to their lower ends in generally straight and parallel relation to each other when unsprung, as shown in FIG. 1. At their outer or lower ends, the legs 12 are formed with hooks 13. These hooks face upwardly and away from each other, and said hooks also face rearwardly to some extent, or in the direction from which the V 9 projects relative to the legs 12.

The hooks are arranged and positioned to project into what are known as the kidney sockets 14 of the side portions of the backbone 3 when the legs 12 are sprung inwardly or toward each other somewhat, as indicated in dotted lines in FIG. 5, and to engage under the bone at the edges of the sockets when the springing pressure on the legs is released.

It is to be noted that the terms "forwardly" and "rearwardly" used in the description of the retainer relate to the positioning of the parts of the retainer with respect to the hind or rear end of the fowl to which the retainer is applied.

To mount the retainer on the fowl, after the legs 4 thereof have been folded over as previously described, and the tail 6 folded under the hocks 5, it is only necessary to lower the retainer over the hocks, while maintaining said retainer substantially at right angles to the longitudinal plane of the folded legs, and while pressing the legs 12 of the retainer toward each other so that the hooks 13 will first pass through the slit or opening 7 of the internal cavity of the fowl, and will then project through the sockets 14. The length of the legs 12 is such that by the time the hooks are fully projected into the sockets 14, the V 9 will seat in the hock depressions 8, while the saddles 10 will snugly engage over the legs of the fowl adjacent the hocks. The retainer may therefore be considered as being a leg positioning and holding yoke.

The above retainer mounting operation is performed by the poultry processor or retailer before the fowl is sold to the consumer, and before the fowl is stuffed. When the housewife or cook desires to stuff the fowl preparatory to cooking the same, it is only necessary to depress and pull ahead on the legs 4 for the hocks to become disengaged from the retainer, and back the tail 6 away from the slit or opening 7. This leaves said opening unobstructed for the insertion of the stuffing therethrough. This being done, the tail is again folded over the opening 7, and the leg-hocks 5 again placed under the saddles 10 so that the V 9 engages the hock depressions in locating relation. The retainer is left in place during the roasting of the fowl, and it does not even have to be removed for the subsequent carving operation. It will also be seen that the retained fowl legs effectively close the slit or opening 7, and it is unnecessary to sew up the opening to prevent the escape of the stuffing.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

I claim:

1. A retainer for use in the trussing of a dressed fowl, the legs of the fowl when dressed terminating in exposed hocks each formed with a crease intermediate the side edges thereof and such creases being disposed in V-forming relation to each other when said legs are folded against the body of the fowl in angled relation to each other with the hocks in substantially contacting relation; the retainer consisting of a yoke of substantially rigid but resilient wire, said yoke centrally of its ends having a depending V-shape portion to engage in the angled creases of the hocks, saddles projecting laterally from the ends of the V portion to engage over the legs of the fowl adjacent the hocks, legs depending from the outer ends of the saddles of a length to project through the body of the fowl to the backbone thereof, and hooks on the lower ends of the legs of the yoke to project through orifices in the side portions of said backbone in position to engage under said bone at the edges of the orifices.

2. A device, as in claim 1, in which the legs of the yoke are arranged to be sprung toward each other from their initial unsprung position, the hooks projecting in opposite directions from each other.

3. A retainer for use in the trussing of a dressed fowl, the legs of the fowl when dressed terminating in exposed hocks and being then folded against the body of the fowl with the hocks in contacting relation; the retainer consisting of a yoke of substantially rigid wire, said yoke centrally of its ends having transversely spaced saddles angled relative to each other to engage over the legs adjacent the hocks, legs depending from the outer ends of the saddles of a length to project through the body of the fowl to the backbone thereof, and hooks on the lower ends of the yoke legs disposed in opposed relation to each other in position to project through orifices in the side portions of the backbone of the fowl and to engage under the bone at the side edges of said orifices.

4. A retainer for use in the trussing of a dressed fowl, the legs of the fowl when dressed terminating in exposed hocks and being then folded against the body of the fowl with the hocks in contacting relation; the retainer consisting of a yoke of substantially rigid material having transversely spaced saddles arranged to detachably engage over the legs adjacent the hocks and hold the same in contact with each other, and elements depending from the laterally outer sides of the saddles arranged for holding engagement with the backbone of the fowl laterally out from the tail of the fowl so as to leave the opening into the carcass-cavity of the fowl exposed from side to side below the hocks for the reception of stuffing and enabling the tail to be then folded up between the legs adjacent the hocks to close said opening.

5. A retainer, as in claim 4, with another element on the retainer between the saddles to engage the hocks and maintain the same against relative longitudinal movement.

References Cited in the file of this patent

UNITED STATES PATENTS

| | | |
|---|---|---|
| 1,633,499 | Selden | June 21, 1927 |
| 2,583,913 | Weiterschan | Jan. 29, 1952 |